(12) United States Patent
Suzuki et al.

(10) Patent No.: US 6,530,397 B2
(45) Date of Patent: Mar. 11, 2003

(54) MULTI-CHANNEL ROTARY JOINT (75) Inventors: Osamu Suzuki, Osaka (JP); Yasutaka Iwamoto, Osaka (JP)

(73) Assignee: Nippon Pillar Packing Co., Ltd., Osaka (JP)

(*) Notice: Subject to any disclaimer, the term of this patent is extended or adjusted under 35 U.S.C. 154(b) by 0 days.

(21) Appl. No.: 09/884,714

(22) Filed: Jun. 19, 2001

(65) Prior Publication Data

US 2002/0000251 A1 Jan. 3, 2002

(30) Foreign Application Priority Data

Jun. 19, 2000 (JP) ........................................ 2000-183839

(51) Int. Cl.[7] ........................ F16L 37/244; F24B 41/26
(52) U.S. Cl. ........................ 137/580; 451/413; 451/289
(58) Field of Search .................. 137/580; 451/106, 451/146, 147, 148, 149, 143, 173, 210, 246, 247, 269, 289, 307, 317, 324, 398, 413, 414

(56) References Cited

U.S. PATENT DOCUMENTS

| | | | | |
|---|---|---|---|---|
| 3,911,952 A | * | 10/1975 | Sugahara et al. | 137/580 |
| 4,141,180 A | * | 2/1979 | Gill et al. | 451/289 |
| 4,193,226 A | * | 3/1980 | Gill et al. | 451/289 |
| 4,848,400 A | * | 7/1989 | Grant et al. | 137/580 |
| 5,676,590 A | * | 10/1997 | Hiraoka | 451/289 |

* cited by examiner

Primary Examiner—John Rivell
(74) Attorney, Agent, or Firm—Koda & Androlia (57) ABSTRACT

A multi-channel rotary joint including a first joint structural member rotatably linked to a second joint structural member. Sealing regions defined and formed by mechanical seals that are lined up concentrically around relative rotational axis are provided between opposing peripheral surfaces in a relative rotational axial direction of the first and second joint structural members. A plurality of channels passing independently through the sealing regions (except for the sealing region which is used as a drain region) are provided for the first and second joint structural members, and an electrical wire insertion path is provided so as to pass through the inner peripheral region of a mechanical seal that has the smallest diameter. A drain path that opens into the drain region is provided for the joint structural member.

3 Claims, 4 Drawing Sheets

MULTI-CHANNEL ROTARY JOINT

BACKGROUND OF THE INVENTION

1. Field of the Invention

The present invention relates to a multi-channel rotary joint for allowing flow along separate routes without allowing a plurality of fluids of the same or different types to be mixed between relative rotational members in a CMP (Chemical Mechanical Polishing) apparatus (an apparatus for the surface polishing of semiconductor wafers) or the like.

2. Prior Art

For example, in the surface polishing of a semiconductor wafer with a CMP apparatus, a turntable and a top ring are individually rotated with the semiconductor wafer sandwiched in between them. The supply of a wafer polishing liquid, wafer pressurized air, wafer cleaning water (pure water), air-blowing air, or the like, or the suction discharge of polishing residue, the vacuum chucking of a semiconductor wafer and a lapping plate or the like, and so forth may be performed between the rotating member (the top ring or the turntable) and the stationary side that supports the rotating side (the CMP apparatus housing). In view of this, with a CMP apparatus, a rotary joint having a plurality of channels is generally provided in between the rotating member and the stationary member in order to allow a plurality of fluids of the same or different types to flow through individual routes (channels) between the relatively rotating members.

In one such multi-channel rotary joint provided between relatively rotating members and known in the past, a first joint structural member attached to the stationary member is rotatably linked to a second joint structural member attached to the rotating member, a plurality of mechanical seals aligned in the relative rotation axial direction are provided between the opposing peripheral surfaces of the first and second joint structural members, and a plurality of channels that pass through sealing regions formed between adjacent mechanical seals are provided for the first and second joint structural members (hereinafter the above multi-channel rotary joint will be referred to as a "conventional joint").

However, the mechanical seals are structured so that a stationary seal ring fixed to one of the first and second joint structural members and a movable seal ring supported movably in the axial direction are rotated relative to each other while pressed into contact by a coil spring. Therefore, in addition to the installation space of the two seal rings, space is further required for the movement of the movable seal ring and for the installation of the coil spring. As a result, a large installation space is needed in the axial direction (the relative rotation axial direction of the first and second joint structural members).

Therefore, in the conventional joint in which a plurality of mechanical seals are lined up in the axial direction, the size in the axial direction is large; and the axial direction size increases along with the number of channels.

Also, the stationary seal ring and the movable seat ring must be in proper contact and vibration or axial runout between the first and second joint structural members must be effectively prevented in order for good sealing function to be realized with a mechanical seal. Therefore, the bearing that rotatably links the first and second joint structural members must be provided at least on both sides of the mechanical seal group, and leaving enough space for the installation of these bearings makes the rotary joint even larger in the axial direction. Naturally, as the number of mechanical seals increases, it eventually becomes impossible to effectively prevent axial runout and the like merely by disposing bearings on both sides of the mechanical seal group, making it necessary to dispose bearings in the middle part of the mechanical seal group as well.

Meanwhile, with a CMP apparatus or the like, even though there may be enough space in the direction (radial direction) perpendicular to the relative rotational axial direction of the two members due to the structure in which one relative rotational member (a rotating member such as a top ring) is rotatably supported on the other (a stationary member such as the CMP apparatus housing), it is often impossible to increase the size (of the space between the relative rotational members in which the rotary joint is disposed) beyond a certain point in the relative rotational axial direction.

Therefore, a conventional joint cannot be used for a CMP apparatus or the like that requires many fluid routes and that has limited space in the relative rotational axial direction. Even with a device without such space limitations, the overall device becomes larger than necessary when many fluid routes are required.

The size in the axial direction can be reduced with a conventional joint by way of using one of the mechanical seals as a means for sealing two channels. However, such a structure sometimes leads to leakage of fluid from one channel into the other due to pressure fluctuations within the channel and so forth. In such a case, even if the leak is very small, if the fluid flowing through the other channel is pure water for processing a wafer, for example, the admixture of the fluid flowing through the first channel can have adverse effects on the wafer. Therefore, in the conventional joint, when handling fluids that must not be admixed with fluids from another channel, there is no way to effectively reduce the size in the axial direction. Even if the mechanical seal is made to serve double duty as described above, the reduction in length is minimal.

SUMMARY OF THE INVENTION

Accordingly, it is an object of the present invention to provide a multi-channel rotary joint with which as many channels as possible can be provided with the same size in the axial direction as when a single channel is provided, which can be favorably installed in a small space, and with which a fluid that must not be admixed with other fluids can be made to flow efficiently.

It is another object of the present invention to provide a multi-channel rotary joint with which a plurality of fluids of the same or different types can flow efficiently between relative rotational members through independent channels without the fluids becoming mixed and without increasing the size in the axial direction.

It is a further object of the present invention to provide a multi-channel rotary joint with which even fluids that must not be mixed or brought into contact with other fluids, such as pure water for processing wafers, can be made to flow efficiently by providing a drain region between the sealing regions of adjacent channels.

It is yet another object of the present invention to provide an extremely functional and practical multi-channel rotary joint that can be used to advantage even in a CMP apparatus or the like that requires many fluid routes and has little space to install the rotary joint in the rotational axial direction between the relative rotational members.

The above objects are accomplished by a unique structure of the present invention for a multi-channel rotary joint that comprises:

- a first joint structural member and a second joint structural member which are linked each other in a relatively rotatable fashion;
- three or more sealing regions defined and formed by three or more mechanical seals which are lined up concentrically around a relative rotational axis, the sealing regions being provided between opposing end faces of the first and second joint structural members in a direction of a relative rotational axis of the joint structural members;
- a drain region formed by at least one of the sealing regions;
- a plurality of channels each independently passing through each of the sealing regions except for the sealing region that forms the drain region, the plurality of channels being provided in the first and second joint structural members; and
- a drain path that opens into the drain region and is provided in one of the joint structural members.

The above-described sealing regions (including the one that forms or is used as the drain region) can be formed by annular regions between mechanical seals that are adjacent in the radial direction or can be formed by the inner peripheral region of the mechanical seal with the smallest diameter.

When the above multi-channel rotary joint is used for devices that require electrical connection between the relative rotational members, it is preferable that an electrical wire insertion path that passes through the inner peripheral region of the mechanical seal having the smallest diameter be provided in the first and second joint structural members. If this inner peripheral region is not used as part of the electrical wire insertion path, it can be used as a sealing region that constitutes part of the channel, or as the drain region.

In addition, in order to effectively prevent the admixture of bearing lubricating oil into the channel, along with further reducing the axial direction size and facilitating the maintenance of the bearing linking the first and second joint structural members, it is preferable to provide: a bearing which rotatably links opposing peripheral surfaces of the first and second joint structural members and is interposed between the first and second joint structural members, and an oil seal that is disposed between the bearing and an outer periphery of a mechanical seal that has a largest diameter, thus using an annular region between the mechanical seal and the oil seal as the drain region, and providing a drain path which opens into the drain region in one of the first and second joint structural members.

DETAILED DESCRIPTION OF THE PREFERRED EMBODIMENTS

Figure 1:
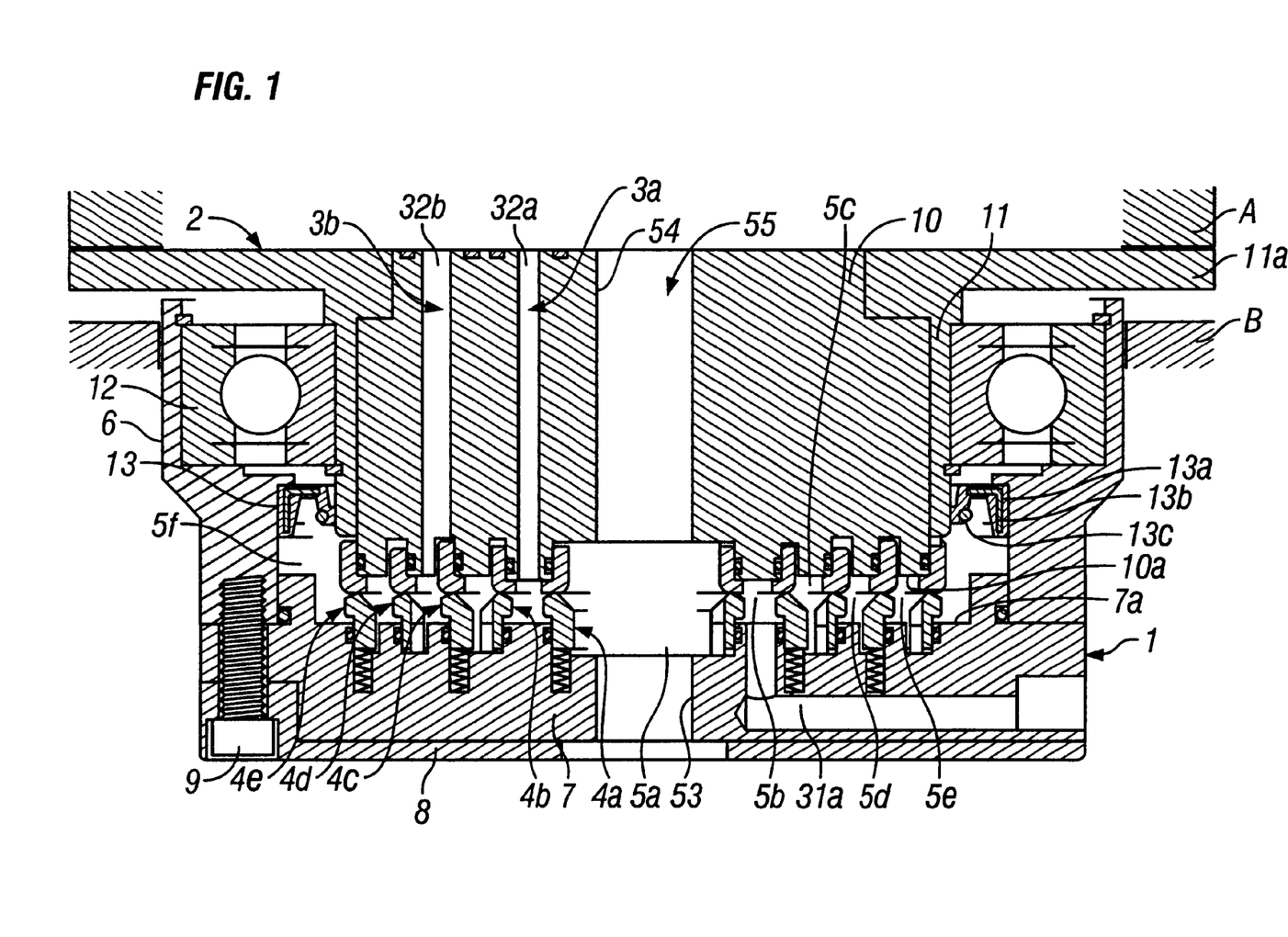
FIG. 1 is a cross sectional view of the multi-channel rotary joint according to the present invention.
Figure 2:
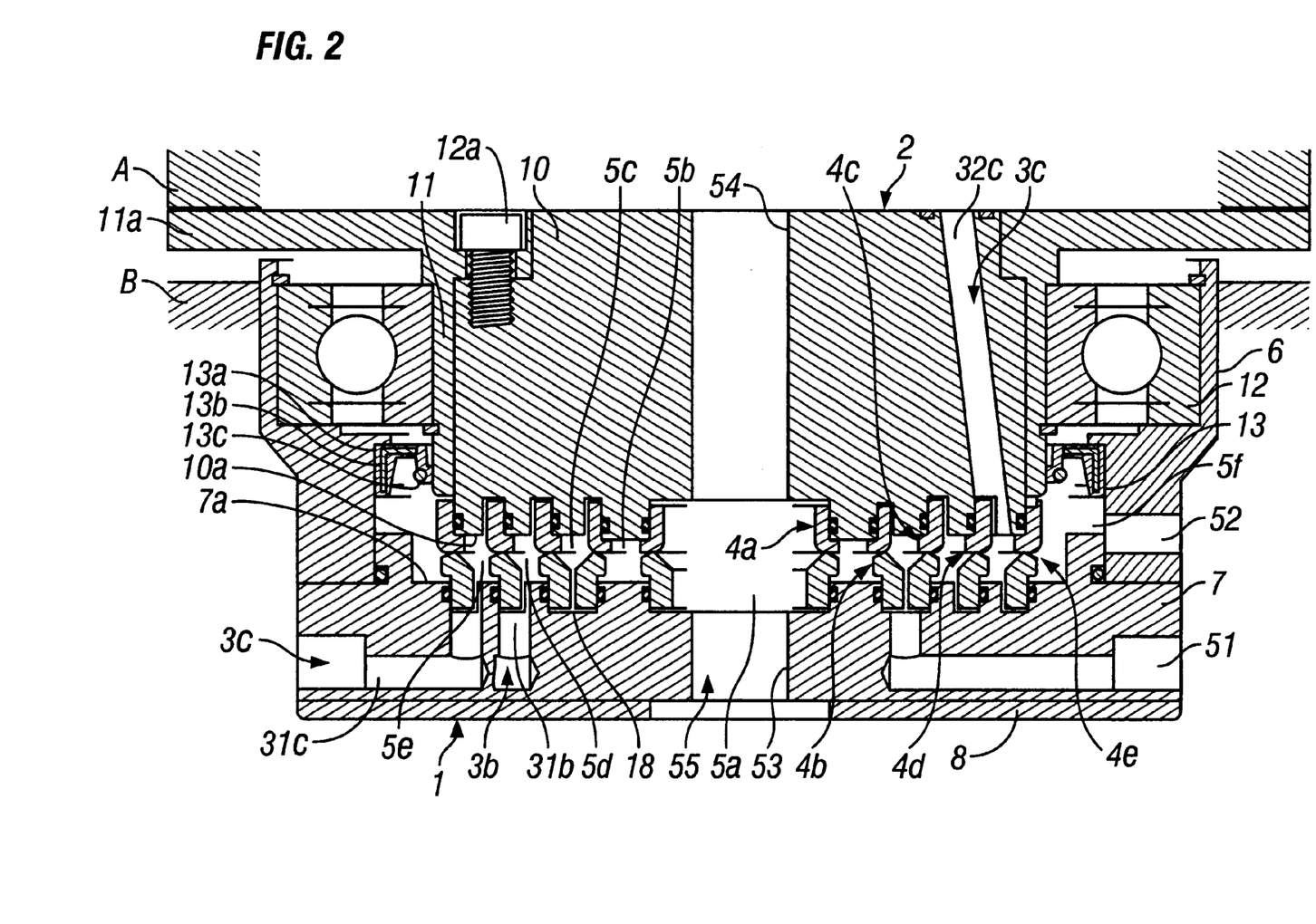
FIG. 2 is a cross sectional view viewed at a different position from that in FIG. 1.
Figure 3:
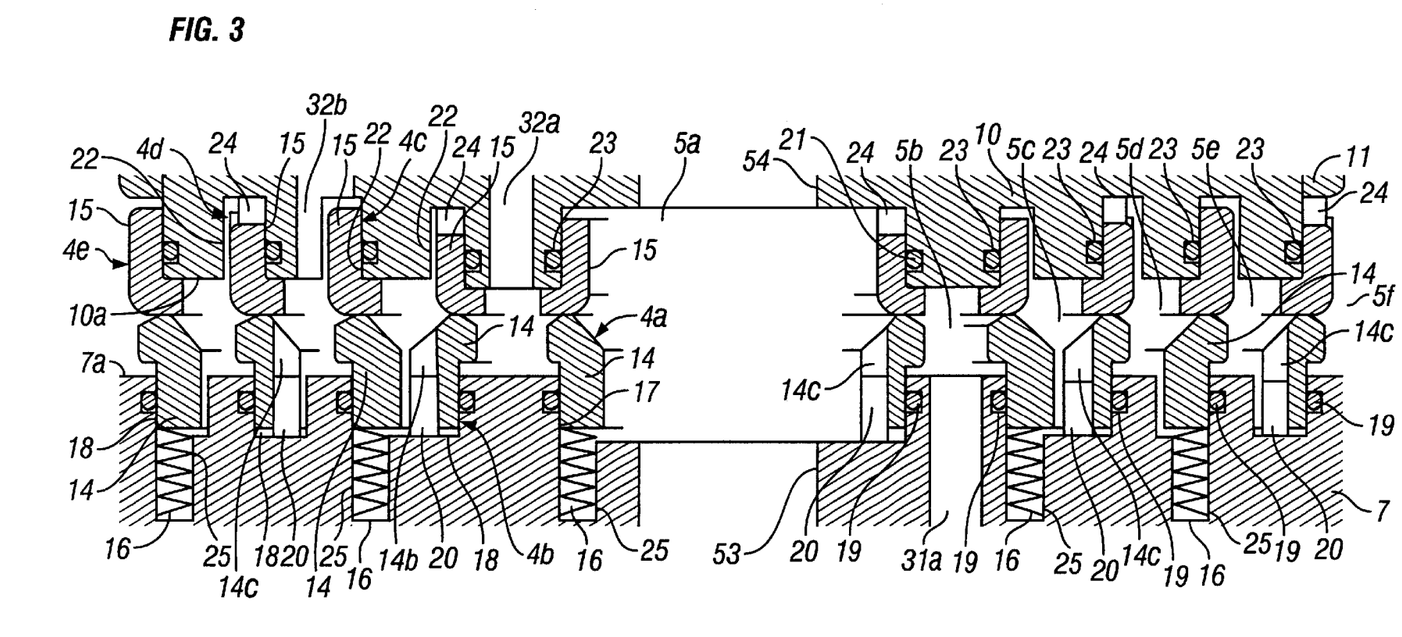
FIG. 3 is an enlarged view of the essential portion of the rotary joint shown in FIG. 1.

As seen from FIGS. 1 and 2, the multi-channel rotary joint of this embodiment is provided between relative rotational members of a CMP apparatus, namely, between a rotating member A such as a turntable and a stationary member B such as a CMP apparatus housing that rotatably supports the rotating member A. The multi-channel rotary joint comprises a first joint structural member 1 attached to the stationary member B, a second joint structural member 2 attached to the rotating member A, a plurality of channels 3 provided in the joint structural members 1 and 2, a plurality of mechanical seals 4 that seal the relative rotational portions of the various channels 3, and drain paths 51 and 52 provided for the first joint structural member 1.

As shown in FIG. 1, the first joint structural member 1 consists of a cylindrical peripheral wall 6, a thick disk-shaped bottom wall 7, and a thin disk-shaped attachment plate 8. A suitable number of bolts 9 (only one is depicted) inserted into the outer peripheral portion of the bottom wall 7 and the underlying attachment plate 8 are threaded into the bottom end of the peripheral wall 6 to assemble a bottomed cylinder structure.

As shown in FIG. 2, the second joint structural member 2 consists of a solid cylindrical shaft 10 and a hollow cylindrical sleeve 11. The sleeve 11 is fitted to the shaft 10 and attached with a suitable number of bolts. 12a (only one is depicted) to assemble an integrated structure in which the bottom end of the shaft 10 protrudes slightly downward from the sleeve 11. An annular flange 11a for attaching to the rotating member A is integrally molded at the top end of the sleeve 11.

As shown in FIGS. 1 and 2, the joint structural members 1 and 2 are rotatably linked by a single bearing 12 interposed between the opposing peripheral surfaces of the peripheral wall 6 of the first joint structural member 1 and the sleeve 11 of the second joint structural member 2 in a state in which the top surface 7a of the bottom wall 7 of the first joint structural member 1 closely faces the bottom surface 10a of the shaft 10 of the second joint structural member 2. Furthermore, an oil seal 13 is interposed close under the bearing 12 between the opposing peripheral surfaces of the peripheral wall 6 and the sleeve 11. This oil seal 13 consists of a seal ring 13a made of rubber or another such elastic material that is fitted to and supported by the inner periphery of the peripheral wall 6 and pressed in contact with the outer periphery of the sleeve 11, a reinforcing metal piece 13b embedded in the seal ring 13a, and a garter spring 13c for ensuring good contact force for the seal ring inner periphery against the sleeve 11.

Through-holes 53 and 54 are formed in the centers of the joint structural members 1 and 2, respectively. The through-holes 53 and 54 function as electrical wire insertion holes 55 that pass through the axis (relative rotational axis) of the joint structural members 1 and 2. More specifically, these electrical wire insertion holes 55 allow for the insertion of electrical wires (not shown) for conducting power between the rotating member A and the stationary member B and for performing various types of electrical control. A rotary connector is installed between the through-holes 53 and 54 as needed.

As shown in FIGS. 1 and 2, the mechanical seals 4 are installed in a row between the opposing peripheral surfaces in the axial direction of the joint structural members 1 and 2, that is, between the top surface 7a of the bottom wall 7 and the bottom surface 10a of the shaft 10, such that they are concentric around the axis of the joint structural members 1 and 2 (the relative rotational axis of the joint structural members 1 and 2.) A plurality of concentric sealing regions 5 are defined between the opposing peripheral surfaces 7a and 10a of the joint structural members 1 and 2. In this structure, as seen from FIGS. 1 and 2, five mechanical seals 4 of different diameters are concentrically disposed between the opposing peripheral surfaces 7a and 10a of the joint structural members 1 and 2, five sealing regions 5 are formed as annular regions between the inner peripheral region of the smallest-diameter mechanical seal 4 and the radially adjacent mechanical seals 4, and a drain region 5f is formed as an annular region between the oil seal 13 and the largest-diameter mechanical seal 4.

In the following description, when it is necessary to distinguish one mechanical seal 4 from the others, they will be labeled as follows, in order starting with the one with the smallest diameter: "first mechanical seal 4a," "second mechanical seal 4b," "third mechanical seal 4c," "fourth mechanical seal 4d," and "fifth mechanical seal 4e." When it is necessary to distinguish one sealing region 5 from the others, they will be labeled as follows, in order starting with the one formed by the inner peripheral region of the first mechanical seal 4a: "first sealing region 5a," "second sealing region 5b," "third sealing region 5c," "fourth sealing region 5d," and "fifth sealing region 5e."

As shown in FIGS. 1 and 2, three channels 3 independently passing through the sealing regions 5 other than the first and third sealing regions 5a and 5c (hereinafter referred to as the "first channel 3a," "second channel 3b," and "third channel 3c") are formed in the joint structural members 1 and 2.

More specifically, the first channel 3a is serially constituted by the second sealing region 5b between the first and second mechanical seals 4a and 4b and through-holes 31a and 32a that are formed in the bottom wall 7 of the first joint structural member 1 and in the shaft 10 of the second joint structural member 2 and that open into the second sealing region 5b. The second channel 3b is serially constituted by the fourth sealing region 5d between the third and fourth mechanical seals 4c and 4d and through-holes 31b and 32b that are formed in the bottom wall 7 and the shaft 10 and that open into the fourth sealing region 5d. The third channel 3c is serially constituted by the fifth sealing region 5e between the fourth and fifth mechanical seals 4d and 4e and through-holes 31c and 32c that are formed in the bottom wall 7 and the shaft 10 and that open into the fifth sealing region 5e.

In the above structure, the first channel 3a is used as a passage through which flows a fluid with which admixture with other fluids and metal contamination must be avoided, such as a processing fluid such as pure water or a polishing liquid used in the processing (such as surface polishing) of semiconductor wafers, for example. The second and third channels 3b and 3c are used as passages through which flow non-processing fluids such as pressurized air or city water (or a similar type of fluid with which admixture has no effect) of which no special conditions are required (such as avoiding metal contamination). The through-holes 31a, 31b and 31c are disposed such that they do not communicate with the spring fitting recesses 25, which are discussed below.

The electrical wire insertion hole 55 passes through the first sealing region 5a formed by the inner peripheral region of the smallest-diameter first mechanical seal 4a, and the first sealing region 5a constitutes the electrical wire insertion hole 55 along with the through-holes 53 and 54.

The third sealing region 5c formed as an annular region between the second and third mechanical seals 4b and 4c is used as a drain region; and as seen from FIG. 2, a drain path 51 that opens into the drain region 5c is formed in the bottom wall 7 of the first joint structural member 1. Also, as shown in FIG. 2, a drain path 52 that opens into the drain region 5f under the oil seal 13 is formed in the bottom wall 7.

As shown in FIGS. 1 to 4, each of the mechanical seals 4 comprises a movable seal ring 14 supported movably in the axial direction (up and down) by the top surface 7a of the bottom wall 7 of the first joint structural member 1, a stationary seal ring 15 fixed to the bottom surface 10a of the shaft 10 of the second joint structural member 2 so as to be perpendicular to the movable seal ring 14, and a plurality of coil springs 16 (only one is depicted) that bias the movable seal ring 14 to be in pressing contact against the stationary seal ring 15. Each mechanical seal 4 is an end-contact type that exhibits its sealing function through the relative rotational sliding action of the seal end faces 14a and 15a, which are the opposing end faces of the seal rings 14 and 15.

As seen from FIGS. 1 to 4, in the first mechanical seal 4a, the movable seal ring 14 is fitted and supported in a circular recess 17 formed at the center of the top surface 7a of the bottom wall 7; and in the other mechanical seals 4 besides the first mechanical seal 4a, the movable seal ring 14 is fitted and supported in an annular groove 18 formed in the top surface 7a of the bottom wall 7. The movable seal rings 14 of the second and third mechanical seals 4b and 4c are fitted and supported in close proximity to a common annular groove 18, and the movable seal ring 14 of the second mechanical seal 4b is externally fitted and supported in the inner radial side wall of the common annular groove 18, while the movable seal ring 14 of the third mechanical seal 4c is internally fitted and supported in the outer radial side wall of the common annular groove 18.

The movable seal rings 14 of the mechanical seals 4 are each secondarily sealed off from the bottom wall 7 by an O-ring 19 in a state in which their vertical movement is allowed. The movable seal rings 14 are prevented from relative rotation with the bottom wall 7 by a drive pin 20.

More specifically, as shown in FIGS. 1 to 4, in the second mechanical seal 4b, the O-ring 19 secondarily seals between the inner peripheral surface of the movable seal ring 14 and the inner radial wall surface of the annular groove 18; and in all the other mechanical seals 4, the O-rings 19 secondarily seal between the outer peripheral surfaces of the movable seal rings 14 and the side wall surfaces of the circular recesses 17 or the outer radial side wall surfaces of the annular grooves 18. As shown in FIGS. 1 to 4, the drive pin 20 sticks up from the floor of the circular recess 17 or the annular groove 18; and in the second mechanical seal 4b the drive pin 20 engages with a groove 14b formed in the outer periphery of the movable seal ring 14, but in the other mechanical seals 4 the drive pin 20 engages with a groove 14c formed in the inner periphery of the movable seal ring 14.

Furthermore, as shown in FIGS. 1 to 4, in the first mechanical seal 4a the stationary seal ring 15 is fitted and fixed in a circular recess 21 formed at the center of the bottom surface 10a of the shaft 10, in the fifth mechanical seal 4e the stationary seal ring 15 is fitted and fixed in the outer peripheral surface of the bottom surface 10a of the shaft 10, and in all the other mechanical seals 4 the stationary seal ring 15 is fitted and fixed in an annular groove 22 formed in the bottom surface 10a of the shaft 10. An O-ring 23 that secondarily seals each stationary seal ring 15 and the shaft 10 is interposed at the joint between these components 10 and 15. Each stationary seal ring 15 is prevented from relative rotation with respect to the shaft 10 by engagement of a drive pin 24, which sticks up from the floor of the annular groove 22 or the circular recess 21 or the bottom surface of the sleeve 11, with a recess formed at the top of the stationary seal ring 15.

The coil springs 16 in each of the mechanical seals 4 are fitted into a plurality of recesses 25 (only one is depicted) provided at a specific pitch in the peripheral direction to the floor of the annular groove 18 or the circular recess 17. The coil springs 16 bias and press the movable seal ring 14 upward so that it presses against the stationary seal ring 15.

Also, in the above structure, the seal end face 15a at the bottom of each stationary seal ring 15 is in the form of a smooth, circular ring that is perpendicular to the axis (relative rotational axis) of the joint structural members 1 and 2. The seal end face 14a at the top of each movable seal ring 14 is a knife edge in the form of a circular ring with a microscopic width W and is, therefore, in nearly point contact with the opposite seal end face 15a of the stationary seal ring 15 (see FIG. 4).

In case that the processing liquid that passes through the channels 3, such as the first channel 3a, is a slurry such as a polishing liquid containing solid or coagulated components, there is a danger that the slurry will infiltrate between the seal end faces 14a and 15a, the solid or coagulated components contained therein will adhere to and build up on these faces, and the good state of contact between the seal end faces 14a and 15a will be lost. This adhesion and build-up of solid components and the like can be effectively prevented by having the seal end face 14a be in the form of a knife edge with a microscopic width W as described above. More specifically, any solid components or the like that infiltrate and adhere between the seal end faces 14a and 15a will be scraped off by the knife-edge-shaped seal end face 14a (This function will hereinafter be referred to as the "adhesion removal function.").

Furthermore, making the seal end face width W microscopic and thereby keeping the contact surface area of the seal end faces 14a and 15a small effectively suppresses wear and heat generation caused by contact between the seal end faces 14a and 15a even under dry conditions (This function will hereinafter be referred to as the "wear suppression function."). Such dry conditions include cases in which any processing liquid remaining in the first channel 3a after polishing is discharged under vacuum suction, and cases in which a gas such as pressurized air is allowed to flow into the second or third channel 3b or 3c.

In order to have the adhesion removal function and wear suppression function work most effectively, it is preferable to set the seal end face width W at 1 to 5 mm. If W>5 mm, the solids removal function provided by the seal end face 14a will not be sufficiently manifested, and wear caused by contact between the seal end faces 14a and 15a cannot be effectively prevented. On the other hand, if W<1 mm, aside from the problem of the strength of the seal end face 14a, the scraping force produced by the seal end face 14a will be excessive; and there is the danger that the lubricating film formed between the seal end faces 14a and 15a will break down and the seal end faces 14a and 15a will seize. Furthermore, the contact pressure between the seal end faces 14a and 15a will be higher than necessary, wear caused by contact between the seal end faces 14a and 15a will not be effectively suppressed, and more wear dust will be generated. Therefore, the seal end face width W should be appropriately set within the above-described range (1 mm≦W≦5 mm) according to the sealing conditions (the properties of the fluid to be sealed, the pressure, and so forth).

Figure 4:
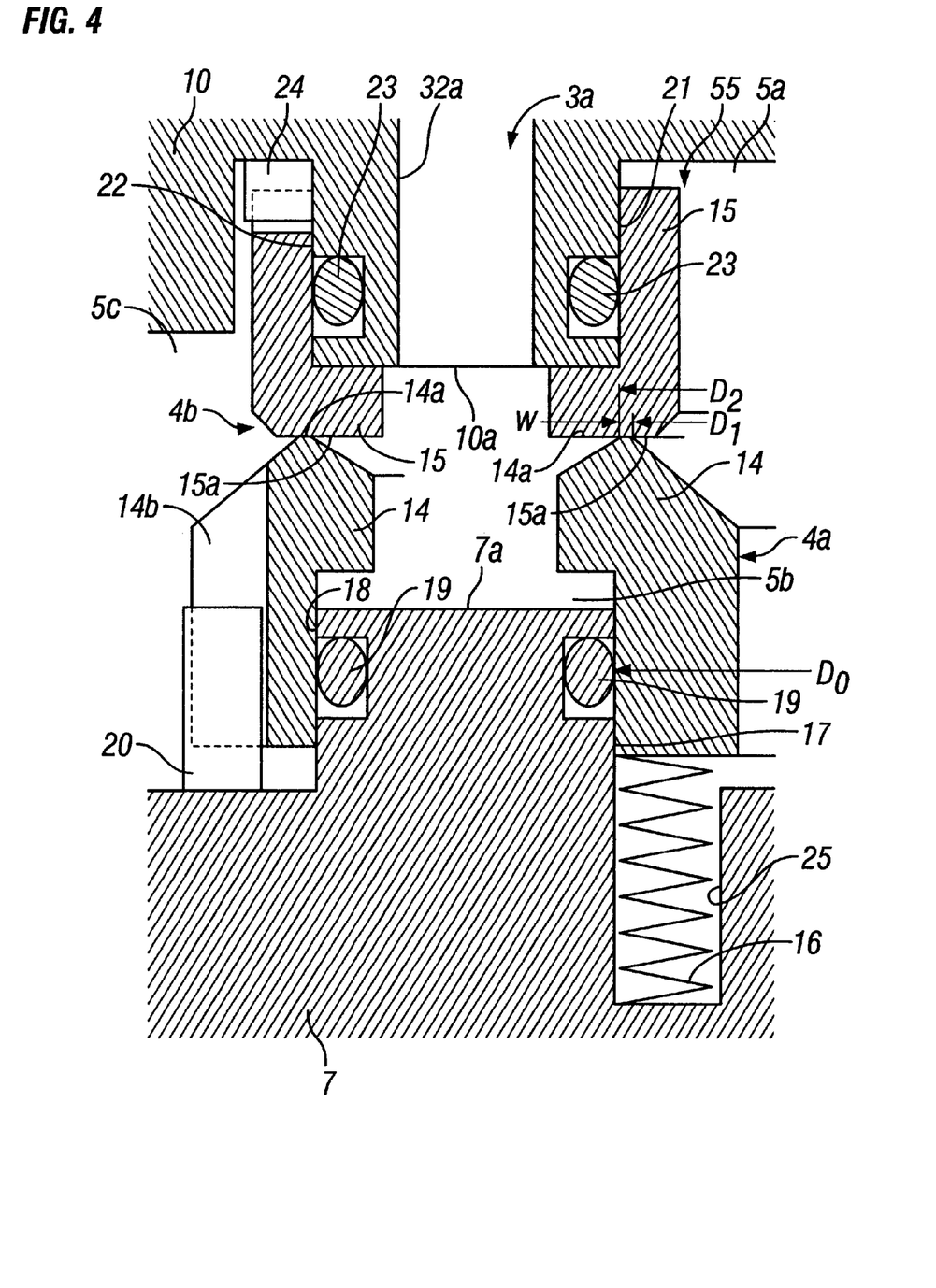
FIG. 4 is an enlarged view of the essential portion of the rotary joint shown in FIG. 2.

Each mechanical seal 4 is an end-contact type in which the inner peripheral region and outer peripheral region of the relative rotational sliding portions of the seal end faces 14a and 15a are sealed by the relative rotational sliding action thereof; and in this structure, as shown in FIG. 4, each mechanical seal 4 is also designed to be a balanced seal in which the balance ratio κ is 0≦κ≦0.5, so that it can adequately cope with switching between positive and negative pressure, with inversion of the pressure balance between the above-described inner and outer peripheral regions (when the pressures in the two regions are inverted between high and low), and so forth.

The first mechanical seal 4a shown in FIG. 4 will now be used as an example.

For design purposes, the balance ratio κ of the mechanical seals 4 is determined by the inside and outside diameters $D_1$ and $D_2$ (the inside and outside diameters of the seal end face 14a; $(D_2-D_1)/2=W$) of the relative rotational sliding portions of the seal end faces 14a and 15a and by the diameter $D_0$ of the secondary sealing portion of the movable seal ring 14 (the outside diameter of the movable seal ring in contact with the O-ring 19; hereinafter referred to as the "balance diameter"), and $\kappa=((D_1)^2-(D_0)^2)/((D_2)^2-(D_1)^2)$.

More specifically, as shown in FIG. 4, if Pa and Pb (Pa<Pb) are the pressure in the inner peripheral region (first sealing region) 5a and outer peripheral region (second sealing region) 5b of the relative rotational sliding portions of the seal end faces 14a and 15a, and if F is the biasing force (spring pressure) produced by the coil springs 16, then the apparent surface pressure (propulsion) P acting on this relative rotational sliding portions is obtained by the equation of:

$$P=(\pi/4)\ ((D_1)^2-(D_0)^2)\ (Pb-Pa)/(\pi/4)((D_2)^2-(D_1)^2)+(\pi/4)((D_2)^2-(D_1)^2)F/(\pi/4)\ ((D_2)^2-(D_1)^2)=(((D_1)^2-(D_0)^2)/((D_2)^2-(D_1)^2))(Pb-Pa)+F.$$

The first term coefficient $((D_1)^2-(D_0)^2)/((D_2)^2-(D_1)^2)$ is the balance ratio κ.

Thus, the balance ratio κ ends up being determined by the inside and outside diameters $D_1$ and $D_2$ and the balance diameter $D_0$ of the seal end face 14a. If it is set such that 0≦κ≦0.5, then the contact pressure of the seal end faces 14a and 15a can be suitably maintained without any major change in the above-described propulsion P, and a good seal can be achieved between the regions 5a and 5b defined by the mechanical seal 4a, even when there is fluctuation in the size or sign of the pressure differential (Pb−Pa) between the regions 5a and 5b (such as when the second sealing region 5b is switched between a positive pressure mode (during the flow of the processing liquid) and a negative pressure mode (during the vacuum discharge of the processing liquid) in a relationship with the first sealing region 5a in which the pressure Pa is constant at atmospheric pressure).

In the shown embodiment, κ is set to be equal or approximate zero by way of letting the inside diameter $D_1$ or outside diameter $D_2$ or average diameter $((D_1+D_2)/2)$ of the seal end face 14a that is in the form of a knife edge be the same or substantially the same value as the balance diameter $D_0$.

In addition to being selected according to the required function and mechanical strength, the materials of which the various members of the rotary joint are made must also be selected according to the properties of the fluids that will be flowing through the channels 3 and to the intended application, and it is generally preferable to select materials that are inert with respect to these fluids. A structural material that is inert with respect to a fluid is determined through its relationship to the properties of that fluid and the usage requirements (such as avoidance of metal contamination).

For instance, when metal contamination is to be avoided, such as when the fluid is a polishing liquid, cleaning liquid, or the like used in the processing of a semiconductor wafer, such a material would be a ceramic or plastic that does not generate metal dust or elute metal components through contact with the fluid. When the fluid is a slurry containing solid components such as polishing grains, such a material would be a ceramic or plastic that does not generate dust through contact with the contained solid components. In the case of a high-temperature fluid, a ceramic or plastic that is heat resistant would be used, whereas in the case of a corrosive fluid, a ceramic or plastic that is resistant to corrosion and chemicals would be used.

Therefore, it is generally preferable for the seal rings 14 and 15 in each of the mechanical seals 4 to be made of a ceramic such as silicon carbide or aluminum oxide that tends not to generate abrasion dust through sliding contact. Naturally, depending on the usage conditions, it is also possible to use one of the engineering plastics discussed below. In this structure, the seal rings 14 and 15 of the mechanical seals 4 are all made of silicon carbide.

Depending on the properties of the fluid and the intended application, it is preferable for fluid contact portions other than the seal rings 14 and 15 (including any portions that might come into contact with the fluid through infiltration) to be made of an engineering plastic such as PEEK (polyether ether ketone), PES (polyethersulfone), or PC (polycarbonate) that does not generate particles through contact with polishing grains or other such solid components and that has excellent dimensional stability in machining, heat resistance, and so forth, or a fluororesin such as PTFE (polytetrafluoroethylene plastic), PFA (tetrafluoroethylene perfluoroalkoxy vinyl ether copolymer), FEP (fluornated ethylene propylene copolymer plastics), or PVDF (polyvinylidene fluoride) with excellent corrosion resistance and chemical resistance. Configurations in which the fluid contact portions of the channels 3 are made of a selected material can be roughly grouped into using the selected material for some or all of the portions formed by the channels 3, and using a selected material layer by means of coating, pipe press-fitting, or the like for just the fluid contact portions (such as the inner walls of the channels 3).

In the shown embodiment, the bottom wall 7 and the shaft 10 in which the channels 3 are formed are made of a synthetic resin such as PP (polypropylene resin) that does not cause metal contamination or the like. The inadequate mechanical strength of the joint structural members 1 and 2 that would otherwise be caused by making the bottom wall 7 and the shaft 10 from a synthetic resin is prevented by making the peripheral wall 6, the attachment plate 8, and the sleeve 11 from metal. Furthermore, the peripheral wall 6 and the attachment plate 8 in particular are made of an aluminum alloy in order to reduce the overall weight of the joint, and the sleeve 11 is made of steel (SUS 316 or the like) in order to maintain the strength of the shaft 10 (the rotator), ensure adequate attachment strength to the rotating member A, and so forth.

In the multi-channel rotary joint described above, a plurality of fluids can be made to flow as desired through independent channels 3. In particular, the infiltration of fluids from the channels 3b and 3c into the first channel 3a is effectively prevented, and good flow can be achieved without causing any problems such as contamination of pure water or another such processing liquid with another fluid, thus allowing wafer processing with this processing liquid to be carried out properly. More specifically, since the drain region (third sealing region) 5c is interposed between the sealing region 5b of the first channel 3a and the sealing region 5d of the adjacent second channel 3b, even if fluid leakage occurs from the sealing region 5d to the sealing region 5b, this leaked fluid will be discharged from the drain path 51 that opens into the drain region 5c and will not infiltrate the second sealing region 5b. Also, in addition to the drain region 5c, the first sealing region 5a is adjacent to the sealing region 5b of the first channel 3a. However, since the first sealing region 5a is an atmospheric region that makes up part of the electrical wire insertion path 55, and since the first mechanical seal 4a comprises the above-described balanced seal, there will be no contamination of the processing liquid flowing through the first channel 3a from the first sealing region 5a side.

Also, even if there is admixture between the second and third channels 3b and 3c, since these channels carry non-processing fluids that have no effect (or the same type of fluids), there is no problem if there is some fluid leakage between the adjacent sealing regions 5d and 5e. If lubricating oil from the bearing 12 should leak into the drain region 5f under the oil seal 13, there is the danger that the oil will infiltrate the sealing region 5e of the third channel 3c adjacent to the drain region 5f; but the leaked oil will be discharged through the drain path 52 that opens into the drain region 5f and will, therefore, not infiltrate the sealing region 5e. Fluid leakage between the sealing region 5e and the regions 5d and 5f adjacent thereto will be prevented more effectively by using balanced seals for the mechanical seals 4d and 4e that seal off these regions.

As seen from the above, the multi-channel rotary joint of the present invention is comprised of: the sealing regions 5b, 5d and 5e for constituting channels 3 between the joint structural members 1 and 2, the drain regions 5c and 5f for avoiding the admixture of fluid into the channels 3, and the region 5a for constituting the electrical wire insertion path 55, and it is further comprised of a plurality of mechanical seals 4 for sealing these regions 5a, 5b, 5c, 5d, 5e, and 5f, and the mechanical seals 4 are disposed concentrically in the radial direction of the joint. Accordingly, the rotary joint takes up an extremely little space in the axial direction.

More specifically, the size in the axial direction can be the same as when a single mechanical seal is provided in a conventional joint, and this remains true no matter how may mechanical seals are installed. Therefore, the present invention can be suitably used even with a CMP apparatus or the like that requires many fluid routes and be used in devices that have limited rotary joint installation space in the rotational axial direction between the relative rotational members (the rotating member A and the stationary member B).

Furthermore, because of the smaller size in the axial direction, as described above, the joint structural members 1 and 2 can be securely linked in a favorable state by the single bearing 12 without causing any axial runout or the like. Accordingly, there is no increase in size in the axial direction due to the bearing 12, and the maintenance of the overall joint, including the bearing 12, can be carried out with ease.

The present invention is not limited to the above-described embodiments and can be modified and improved as needed to the extent that the modification and improvement does not exceed the basic principle of the present invention. For instance, the number and layout of the drain regions for preventing the infiltration of fluid between sealing regions and of the sealing regions for constituting the channels can be set as desired according to the properties of the fluid that is going to be flowing, the intended application, and so forth.

What is claimed is:

1. A multi-channel rotary joint, comprising:

a first joint structural member and a second joint structural member which are linked each other in a relatively rotatable fashion;

three or more sealing regions defined and formed by three or more mechanical seals which are lined up concentrically around a relative rotational axis, said sealing regions being provided between opposing end faces of said first and second joint structural members in a direction of a relative rotational axis of said joint structural members;

a drain region formed by at least one of said sealing regions;

a plurality of channels each independently passing through each of said sealing regions except for said sealing region that forms said drain region, said plurality of channels being provided in said first and second joint structural members; and a drain path that opens into said drain region and is provided in one of said joint structural members.

2. The multi-channel rotary joint according to claim 1, further comprising an electrical wire insertion path that is provided in said first and second joint structural members and passes through an inner peripheral region of a mechanical seal that has a smallest diameter.

3. The multi-channel rotary joint according to claim 1, further comprising:

a bearing that rotatably links opposing peripheral surfaces of said first and second joint structural members and is interposed between said first and second joint structural members; and an oil seal that is disposed between said bearing and an outer periphery of a mechanical seal that has a largest diameter; and wherein an annular region between said mechanical seal and said oil seal forms said drain region, and a drain path that opens into said drain region is provided in one of said first and second joint structural members.

* * * * *